US011902750B2

(12) United States Patent
Killion et al.

(10) Patent No.: US 11,902,750 B2
(45) Date of Patent: Feb. 13, 2024

(54) SYSTEM AND METHOD FOR PROVIDING AN ARRANGEMENT OF TWO FIRST-ORDER DIRECTIONAL MICROPHONES ARRANGED IN TANDEM TO FORM A SECOND-ORDER DIRECTIONAL MICROPHONE SYSTEM

(71) Applicant: Team IP Holdings, LLC, Fort Worth, TX (US)

(72) Inventors: Mead C. Killion, Elk Grove Village, IL (US); Andrew Haapapuro, Arlington Heights, IL (US); Viorel Drambarean, Lincolnwood, IL (US)

(73) Assignee: Team IP Holdings, LLC, Fort Worth, TX (US)

( * ) Notice: Subject to any disclaimer, the term of this patent is extended or adjusted under 35 U.S.C. 154(b) by 99 days.

(21) Appl. No.: 17/735,890

(22) Filed: May 3, 2022

(65) Prior Publication Data

US 2022/0360916 A1 Nov. 10, 2022

Related U.S. Application Data

(60) Provisional application No. 63/183,746, filed on May 4, 2021.

(51) Int. Cl.
*H04R 25/00* (2006.01)

(52) U.S. Cl.
CPC ......... *H04R 25/604* (2013.01); *H04R 25/407* (2013.01); *H04R 25/65* (2013.01)

(58) Field of Classification Search
CPC .... H04R 25/407; H04R 25/604; H04R 25/65; H04R 25/405
USPC .......................................................... 381/313
See application file for complete search history.

(56) References Cited

U.S. PATENT DOCUMENTS 7,832,080 B2 * 11/2010 Killion ................ H04R 25/604 29/609.1
2008/0273727 A1 * 11/2008 Hagen ................. H04R 25/552 381/313

* cited by examiner

*Primary Examiner* — Phylesha Dabney
(74) *Attorney, Agent, or Firm* — McAndrews, Held & Malloy, Ltd.

(57) ABSTRACT

Systems and methods for arranging two first-order directional microphones in tandem to form a second-order directional microphone system of an amplified listening device are provided. The amplified listening device includes a first directional microphone configured to provide a first electrical signal having a first phase, and a second directional microphone reversed in space and configured to provide a second electrical signal having a second phase opposite the first phase. Microphone inlet ports of the first and second directional microphones are linearly aligned in a same plane. The rear microphone inlet ports of the first and second directional microphones are positioned adjacent each other. The amplified listening device includes a resistive summing circuit without phase inverting circuitry. The resistive summing circuit is configured to combine the first electrical signal and the second electrical signal to generate a second order directional response.

20 Claims, 6 Drawing Sheets

SYSTEM AND METHOD FOR PROVIDING AN ARRANGEMENT OF TWO FIRST-ORDER DIRECTIONAL MICROPHONES ARRANGED IN TANDEM TO FORM A SECOND-ORDER DIRECTIONAL MICROPHONE SYSTEM

CROSS-REFERENCE TO RELATED APPLICATIONS/INCORPORATION BY REFERENCE

The present application claims priority under 35 U.S.C. § 119(e) to provisional application Ser. No. 63/183,746 filed on May 4, 2021, entitled "SYSTEM AND METHOD FOR PROVIDING AN ARRANGEMENT OF TWO FIRST-ORDER DIRECTIONAL MICROPHONES ARRANGED IN TANDEM TO FORM A SECOND-ORDER DIRECTIONAL MICROPHONE SYSTEM." The above referenced provisional application is hereby incorporated herein by reference in its entirety.

FIELD

The present disclosure relates to amplified listening devices, such as hearing aids, personal sound amplification products, and hearing protection devices. More specifically, the present disclosure relates to a system and method that provides an arrangement of two first-order directional microphones arranged in tandem to form a second-order directional microphone system of an amplified listening device.

BACKGROUND

Hearing aids and similar devices, such as personal sound amplification products and hearing protection devices, have moved closer in form factor and capability to modern wearable devices.

A first-order directional microphone has at most a theoretical 6.0 dB improvement of the desired frontal signal compared to the summed diffuse noise found in loud social gatherings and loud restaurants. In practice, 1-3 dB effective improvement is more common in actual on-head usage.

In contrast, a second-order microphone allows a theoretical 9.5 dB improvement, which under some circumstances may increase the intelligibility of sentences from 35% to 90% correct as measured by accepted tests of hearing ability in noise. Existing approaches to providing a second-order microphone include additional circuitry configured to electronically subtract two first-order microphones (one in front of the other) to form a second-order directional performance microphone.

Moreover, most recent digital first-order directional hearing aids form their directional performance by connecting one omnidirectional ("front") micro-electro-mechanical system (MEMS) microphone to a first of two analog electrical input and another ("rear") MEMS microphone to the second inlet, and adding a digital delay to the rear microphone before summing with the front microphone. It is self-evident that with this approach not two but four analog inputs would be required to form a second-order microphone, more than is typically provided by hearing aid circuits. Even if two cardioid electret microphones are connected to the two typically available analog inputs and subtracted to form a second order microphone, in order to provide for an omnidirectional microphone option, which is usually preferred in quiet surroundings, a third microphone input would still be required.

Further limitations and disadvantages of conventional and traditional approaches will become apparent to one of skill in the art, through comparison of such systems with some aspects of the present disclosure as set forth in the remainder of the present application.

SUMMARY

Certain embodiments of the present technology provide a system and method for arranging two first-order directional microphones in tandem to form a second-order directional microphone system of an amplified listening device, substantially as shown in and/or described in connection with at least one of the figures.

These and other advantages, aspects and novel features of the present disclosure, as well as details of an illustrated embodiment thereof, will be more fully understood from the following description and drawings.

DETAILED DESCRIPTION

Figure 1:
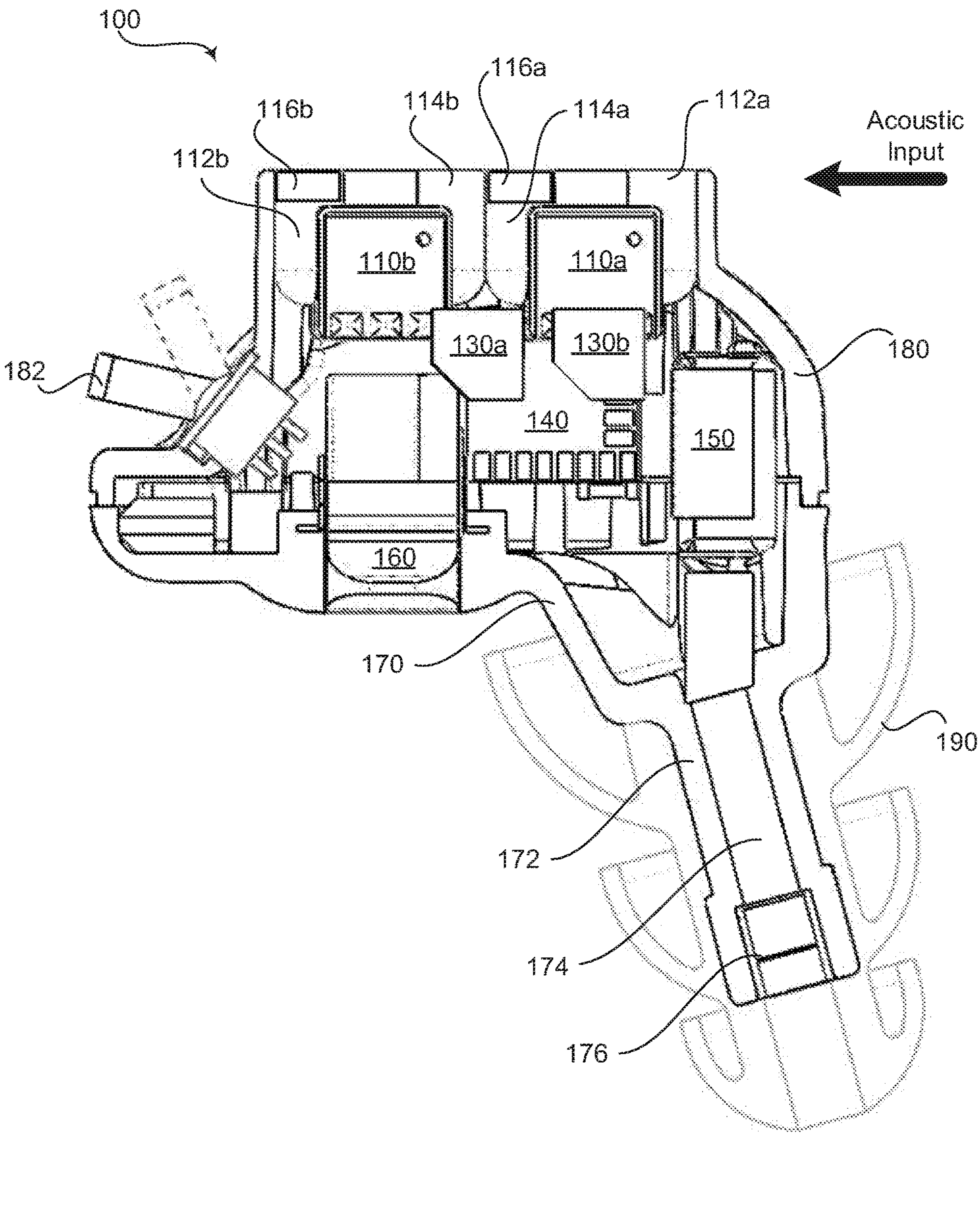
FIG. 1 is a cross-sectional view illustrating an exemplary amplified listening device provided with two first-order directional microphones arranged in tandem to form a second-order directional microphone system, in accordance with embodiments of the present technology.

Embodiments of the present technology provide a system and method for arranging two first-order directional microphones in tandem to form a second-order directional microphone system of an amplified listening device. Various embodiments provide the technical effect of eliminating additional electronic subtraction circuitry by adding the output of two directional microphones, one of which is modified to produce a reversed phase by using a first directional microphone arranged normally in front and a second directional microphone reversed in space behind, such that a former rear microphone inlet port becomes the front microphone inlet port.

The foregoing summary, as well as the following detailed description of certain embodiments will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (e.g., processors or memories) may be implemented in a single piece of hardware (e.g., a general-purpose signal processor or a block of random access memory, hard disk, or the like) or multiple pieces of hardware. It should be understood that the various embodiments are not limited to the arrangements and instrumentality shown in the drawings. It should also be understood that the embodiments may be combined, or that other embodiments may be utilized, and that structural, logical and electrical changes may be made without departing from the scope of the various embodiments. The following detailed description is, therefore, not to be taken in a limiting sense, and the scope of the present disclosure is defined by the appended claims and their equivalents.

As used herein, an element or step recited in the singular and preceded with the word "a" or "an" should be understood as not excluding plural of said elements or steps, unless such exclusion is explicitly stated. Furthermore, references to "an exemplary embodiment," "various embodiments," "certain embodiments," "a representative embodiment," and the like are not intended to be interpreted as excluding the existence of additional embodiments that also incorporate the recited features. Moreover, unless explicitly stated to the contrary, embodiments "comprising", "including", or "having" an element or a plurality of elements having a particular property may include additional elements not having that property.

Furthermore, the term amplified listening device, as used herein, refers to hearing aids customized for specific users by manufacturers and hearing care professionals, personal sound amplification products, hearing protection devices, and any suitable devices that stream audio or amplify sounds with ambient noise features. Additionally, the term processor or processing unit, as used herein, refers to any type of processing unit that can carry out the required calculations, execute algorithms, and make data-driven decisions needed for the various embodiments, such as single or multi-core: CPU, Accelerated Processing Unit (APU), Graphic Processing Unit (GPU), DSP, FPGA, ASIC or a combination thereof.

FIG. 1 is a cross-sectional view illustrating an exemplary amplified listening device 100 provided with two first-order directional microphones 110*a*, 110*b* arranged in tandem to form a second-order directional microphone system, in accordance with embodiments of the present technology.

Figure 2:
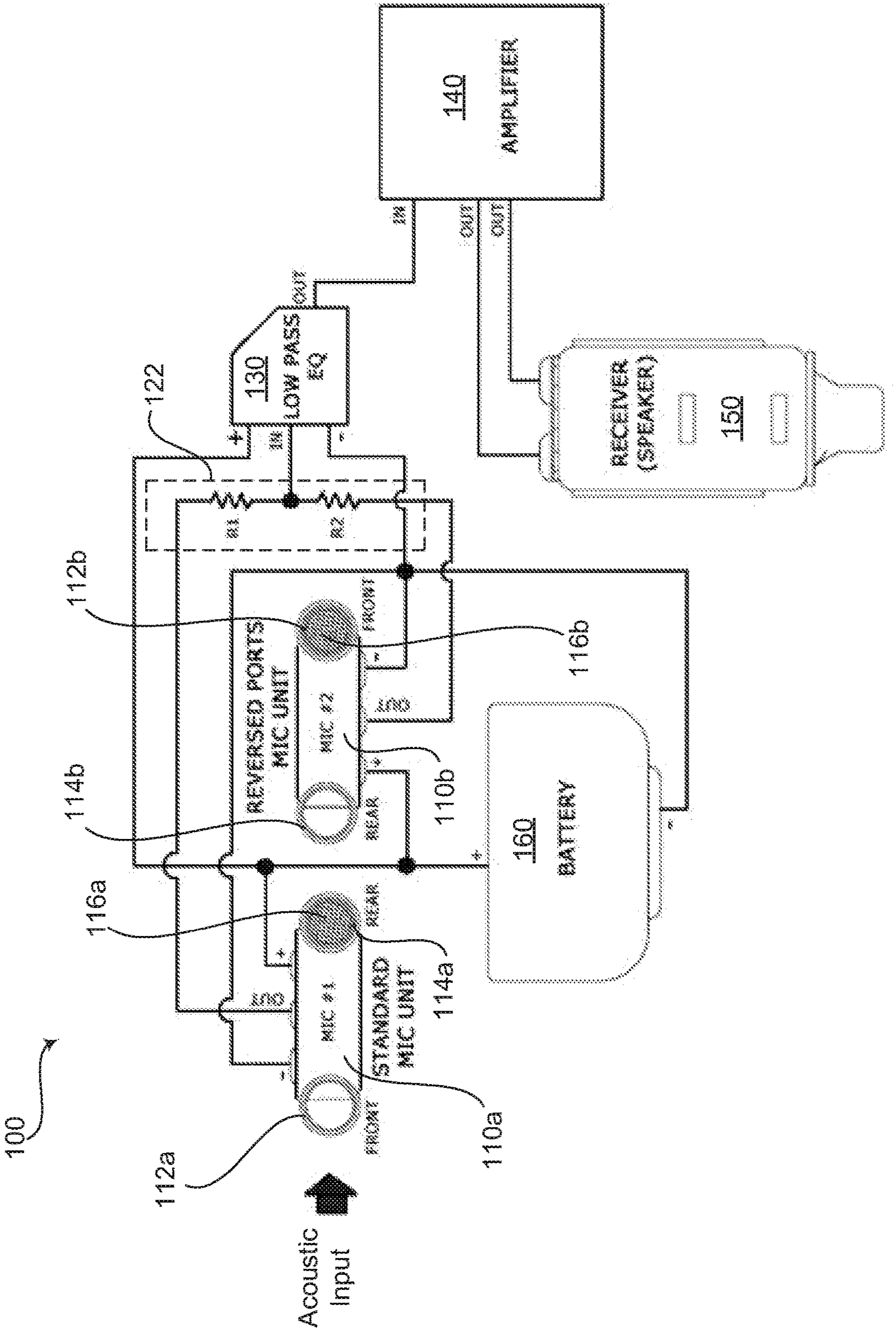
FIG. 2 is a circuit block diagram illustrating an exemplary amplified listening device provided with two first-order directional microphones arranged in tandem to form a second-order directional microphone system, in accordance with embodiments of the present technology.

FIG. 2 is a circuit block diagram illustrating an exemplary amplified listening device 100 provided with two first-order directional microphones 110*a*, 110*b* arranged in tandem to form a second-order directional microphone system, in accordance with embodiments of the present technology.

Figure 3:
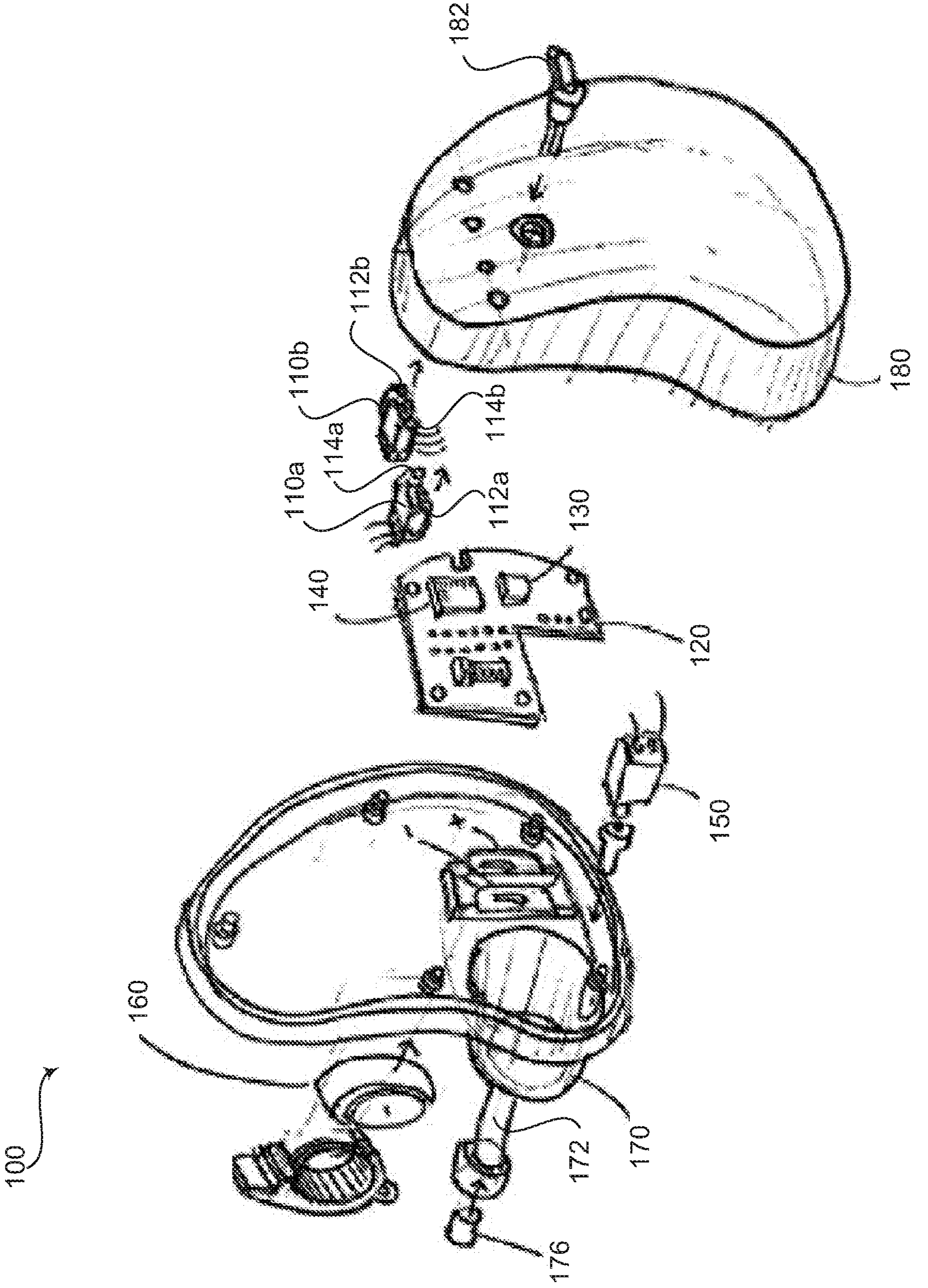
FIG. 3 is an exploded view illustrating an exemplary amplified listening device provided with two first-order directional microphones arranged in tandem to form a second-order directional microphone system, in accordance with embodiments of the present technology.

FIG. 3 is an exploded view illustrating an exemplary amplified listening device 100 provided with two first-order directional microphones 110*a*, 110*b* arranged in tandem to form a second-order directional microphone system, in accordance with embodiments of the present technology.

Referring to FIGS. 1-3, the amplified listening device 100 comprises a first directional microphone 110*a*, a second directional microphone 110*b*, a resistive summing circuit 122, low pass equalization circuitry 130, 130*a*, 130*b*, an amplifier 140, a receiver 150, a battery 160, a housing 170, 180, and an eartip 190.

The first and second directional microphones 110*a*, 110*b* may be cardioid electret microphones (ccMICs) and/or any suitable microphones having a front microphone inlet port 112*a*, 112*b* and a rear microphone inlet port 114*a*, 114*b*. The directional microphones 110*a*, 110*b* tend to reject sound coming from the side and rear of the amplified listening device wearer. As such, the directivity of the directional microphones 110*a*, 110*b* may be used to improve the signal-to-noise ratio of the amplified listening device since it rejects a portion of the noise coming from the sides and behind the amplified listening device wearer. In a preferred embodiment, the second directional microphone 110*b* is turned around (i.e., reversed in space) behind the first directional microphone 110*a* such that the electrical output of the second directional microphone 110*b* is reversed in phase (i.e., opposite a phase of the first directional microphone 110*a*). Specifically, a positive pressure on the first directional microphone 110*a* is provided into the front microphone inlet port 112*a* as normal, while a positive pressure on the reversed second directional microphone 110*b* would go to the back of the second direction microphone diaphragm via the rear microphone inlet port 114*b* and produce an electrical signal having a reversed phase. The first electrical signal having a first phase is output from the first directional microphone 110*a* and a second electrical signal having a second phase opposite the first phase is output from the second directional microphone 110*b*. The first and second electrical signals output from the first and second directional microphones 110*a*, 110*b*, respectively, is provided to a resistive summing circuit 122 or low pass equalization circuitry 130*a*, 130*b*.

The first and second directional microphones 110*a*, 110*b* are arranged such that the front microphone inlet ports 112*a*, 112*b* and rear microphone inlet ports 114*a*, 114*b* are linearly aligned in a same plane. The rear microphone inlet port 114*a* of the first directional microphone 110*a* is positioned adjacent to the rear microphone inlet port 114*b* of the second directional microphone 110*b* because the second directional microphone 110*b* is turned around. Accordingly, from the position of the intended acoustic input (i.e., the front of the amplified listening device 100), the inlet ports 112*a*, 112*b*, 114*a*, 114*b* of the directional microphones 110*a*, 110*b* are arranged in an order of front microphone inlet port 112*a* of the first directional microphone 110*a*, rear microphone inlet port 114*a* of the first directional microphone 110*a*, rear microphone inlet port 114*b* of the second directional microphone 110*b*, and front microphone inlet port 112*b* of the second directional microphone 110*b*.

The first and second directional microphones 110*a*, 110*b* may be spaced apart approximately 6-8 millimeters (mm) in an in-the-ear (ITE) amplified listening device 100. The first and second directional microphones 110*a*, 110*b* may be spaced apart approximately 20 mm (e.g., 17-23 mm) in a behind-the-ear (BTE) amplified listening device 100. The front microphone inlet port 112*a*, 112*b* and rear microphone inlet port 114*a*, 114*b* of each of the first and second directional microphones 110*a*, 110*b* may be mounted approximately 4 mm (i.e., 3-5 mm) apart, so the free-space time delay for on-axis sound would be about 12 microseconds. In order to form a cardioid directional microphone, therefore, an internal time delay of 12 microseconds is provided by positioning an acoustic time-delay resistor 116*a*, 116*b* in the rear microphone inlet port 114*a* of the first directional microphone 110*a* and in the front microphone inlet port 112*b* of the second directional microphone 110*b*. The acoustic time-delay resistor 116*a*, 116*b* may be a mesh screen made of metal, plastic, fabric, and/or any suitable material. In this case, sound from the rear would experience the same time delays reaching a rear chamber of the first directional microphone 110*a* (or front chamber of the second directional microphone 110*b*) and a front chamber of the first directional microphone 110*a* (or rear chamber of the second directional microphone 110*b*), so that the net pressure across diaphragms of the first and second directional microphones 110*a*, 110*b* would be zero and a null in response would occur for 180 degrees sound incidence. Although the above example refers to embodiments implementing cardioid directional microphones 110*a*, 110*b*, any suitable directional microphone polar pattern may be implemented.

The resistive summing circuit 122 comprises resistors configured to add the first and second electrical signals output from the first and second directional microphones 110*a*, 110*b* to generate a second order directional response that may be output to low pass equalization circuitry 130, as shown in FIG. 2, for example. Alternatively, the resistive summing circuit 122 may receive the first and second electrical signals from first and second low pass equalization circuitry 130*a*, 130*b*, respectively, to generate the second order directional response that may be output to the amplifier 140. As shown in FIG. 1, the first low pass equalization circuitry 130*a* may correspond with and receive the first electrical signal from the first directional microphone 110*a*, and the second low pass equalization 130*b* may correspond with and receive the second electrical signal from the second directional microphone 110*b*. Accordingly, the low pass equalization may be performed before or after the first and second electrical signals output from the first and second directional microphones 110*a*, 110*b* are combined by the resistive summing circuitry 122 to generate the second order directional response.

In various embodiments, the resistive summing circuitry 122 may comprise two 22 kOhm resistors, for example, if the first and second directional microphones 110*a*, 110*b* have similar direct current (DC) voltages and sensitives. The resistive summing circuit 122 of the present technology does not include phase inverting circuitry. The two out-of-phase electrical signals output from the first and second directional microphones 110*a*, 110*b* as arranged according to embodiments of the present technology eliminates a need for the additional, expensive circuitry for performing electronic subtraction of two in-phase electrical signals. In an exemplary embodiment, the resistive summing circuit 122 may be provided on a circuit board 120 of the amplified listening device 100.

The low pass equalization circuitry 130 may comprise suitable logic, circuits, interface, and/or code configured to at least partially equalize the amplitude of the low frequency electrical signal components of the second order directional response with the amplitude of the mid and high frequency electrical signal components of the second order directional response. The equalized second order directional response may be provided to the amplifier 140, as shown in FIG. 2. Alternatively, the low pass equalization circuitry 130*a*, 130*b* may comprise first low pass equalization circuitry 130*a* corresponding with the first directional microphone 110*a*, and second low pass equalization circuitry 130*b* corresponding with the second directional microphone 110*b*, as shown in FIG. 1. The first low pass equalization circuitry 130*a* associated with the first directional microphone 110*a* may comprise suitable logic, circuits, interface, and/or code configured to at least partially equalize the amplitude of the low frequency electrical signal components of the first electrical signal with the amplitude of the mid and high frequency electrical signal components of the first electrical signal of the first directional microphone 110*a*. The second low pass equalization circuitry 130*b* associated with the second directional microphone 110*b* may comprise suitable logic, circuits, interface, and/or code configured to at least partially equalize the amplitude of the low frequency electrical signal components of the second electrical signal with the amplitude of the mid and high frequency electrical signal components of the second electrical signal of the second directional microphone 110*b*. The equalized first electrical signal and the equalized second electrical signal may be provided to the resistive summing circuit 122. Accordingly, the low pass equalization circuitry 130, 130*a*, 130*b* may be provided before (as first 130*a* and second 130*b* low pass equalization circuitry as shown in FIG. 1) or after (as low pass equalization circuitry 130 as shown in FIG. 2) the resistive summing circuitry 122. In an exemplary embodiment, the low pass equalization circuitry 130, 130*a*, 130*b* may be provided on a circuit board 120 of the amplified listening device 100.

The amplifier 140 may comprise suitable logic, circuits, interface, and/or code configured to process the equalized second order directional response signal to amplify the equalized second order directional response signal. In various embodiments, an amount of amplification provided by the amplifier 140 may be based on a volume control. The amplifier 140 outputs the amplified second order directional response electrical signal to the receiver 150. In an exemplary embodiment, the amplifier 140 may be provided on a circuit board 120 of the amplified listening device 100.

The receiver 150 may comprise suitable logic, circuits, interface, and/or code configured to convert the amplified second order directional response electrical signals to sound, which is communicated from the receiver 150 to a user's ear canal through an acoustic channel 174 in a sound tube 172.

Electronic components of the amplified listening device 100 may be implemented in software, hardware, firmware, and/or the like. The various electronic components of the amplified listening device 100 may be communicatively linked. Electronic components of the amplified listening device 100 may be implemented separately and/or integrated in various forms.

The battery 160 may be operable to provide power to directional microphones 110*a*, 110*b*, low pass equalization circuitry 130, 130*a*, 130*b*, amplifier 140, and/or receiver 150 in the amplified listening device 100. The battery 310 may be a cell, such as a 312 size zinc-air or lithium-ion cell, or any suitable battery or cell.

The housing 170, 180 may comprise a base 170 and cover 180 configured to house the directional microphones 110*a*, 110*b*, low pass equalization circuitry 130, 130*a*, 130*b*, amplifier 140, and receiver 150. The base 170 may comprise a sound tube 172 having an acoustic channel 174 for outputting sound from the receiver 150 to a user's ear canal. In various embodiments, the acoustic channel 174 of the sound tube 172 may comprise a damper 176 configured to smooth a frequency response. A volume control or toggle switch 182 may extend from the cover 180 of the housing 170, 180. The volume control or toggle switch 182 may be configured to adjust a volume of the amplified listening device 100 or switch between modes of the amplified listening device 100. For example, a volume control 182 may control the gain provided by the amplifier 140. As another example, a toggle switch 182 may be configured to switch between different operating modes of the amplified listening device 100, such as between a directional mode and an omnidirectional mode where the microphones are ccMICs that each include an omnidirectional microphone in addition to the directional microphone 110*a*, 110*b*.

The eartip 190 may be configured to attach to the sound tube 172 of the base 180 of the housing 170, 180. The eartip 190 may be configured to securely hold the amplified listening device 100 in a user's ear canal. For example, the eartip 190 may comprise three concentric circular flanges. The flanges can have increasing diameters, such that the flange furthest from the housing 170, 180 is the smallest, the flange closest to the housing 170, 180 is the largest, and the flange therebetween is an intermediate size. When inserted into a user's ear canal, the smallest flange enters first, and when fully inserted, the eartip can block exterior noise up to about 35 dB or more from entering the ear canal. Such eartips can come in other forms, such as a cylindrical foam eartip, a mushroom shaped foam eartip, or any suitable eartip.

Figure 4:
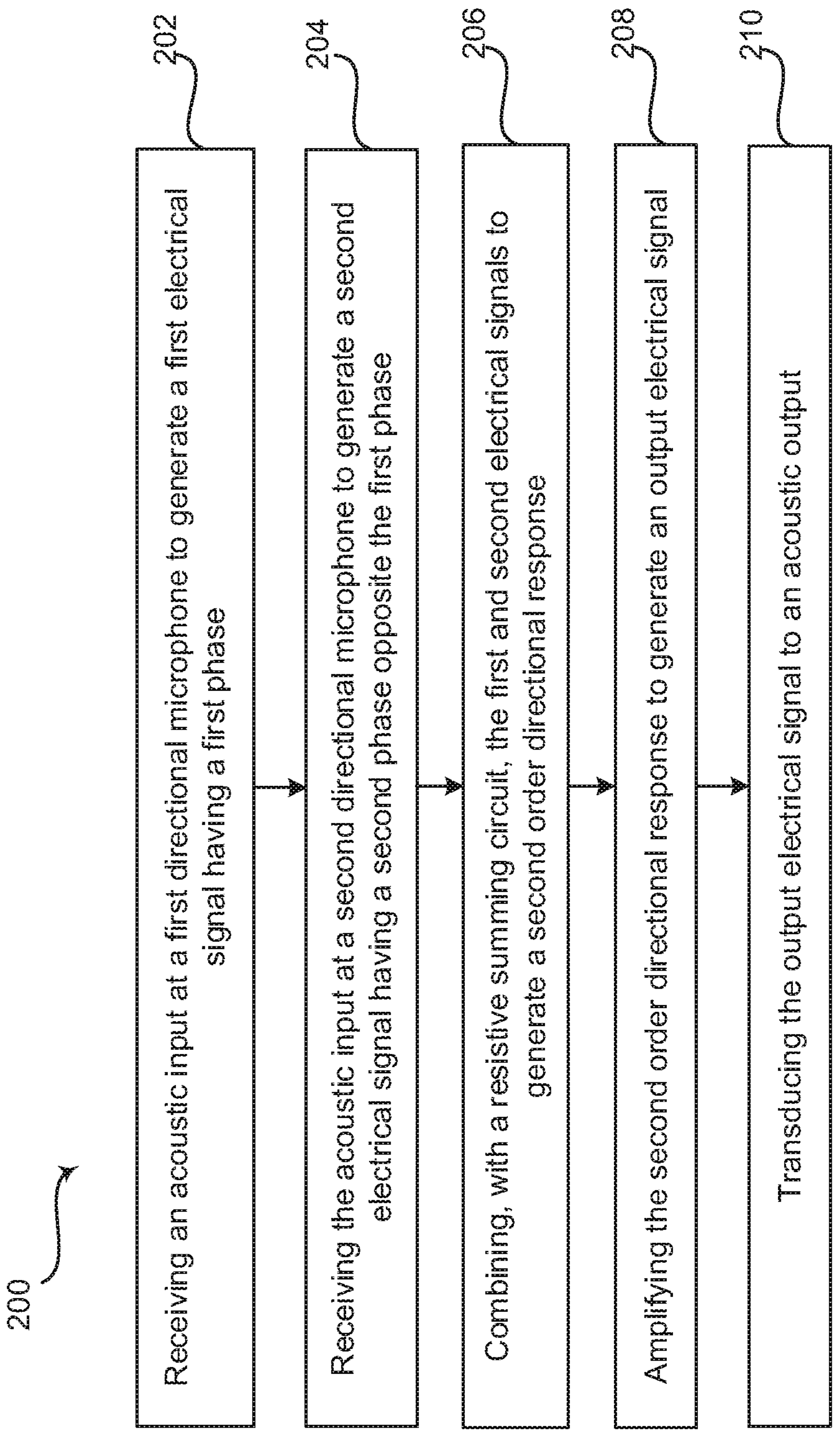
FIG. 4 is a flow diagram illustrating exemplary steps for providing an acoustic output corresponding with a second order directional response, in accordance with embodiments of the present technology.

FIG. 4 is a flow diagram 200 illustrating exemplary steps 202-210 for providing an acoustic output corresponding with a second order directional response, in accordance with embodiments of the present technology. Referring to FIG. 4, there is shown a flow chart 200 comprising exemplary steps 202 through 210. Certain embodiments may omit one or more of the steps, and/or perform the steps in a different order than the order listed, and/or combine certain of the steps discussed below. For example, some steps may not be performed in certain embodiments. As a further example, certain steps may be performed in a different temporal order, including simultaneously, than listed below.

At step 202, an acoustic input is received at a first directional microphone 110*a* to generate a first electrical signal having a first phase. For example, a first directional microphone 110*a* arranged normally with a front microphone inlet port 112*a* closest to the acoustic input (i.e., sound received from a front of amplified listening device 100) and a rear microphone inlet port 114*a* approximately 4 mm behind the front microphone inlet port 112*a* may receive the acoustic input. The rear microphone inlet port 114*a* comprises an acoustic time-delay resistor 116*a* that provides an internal time delay (e.g., approximately 12 microseconds). The acoustic time-delay resistor 116*a* may be a mesh screen made of metal, plastic, fabric, and/or any suitable material. The acoustic input is converted to a first electrical signal having a first (i.e., normal) phase by the first directional microphone 110*a*. The first electrical signal may be provided to a resistive summing circuit 122 or low pass equalization circuitry 130*a*.

At step 204, the acoustic input is received at a second directional microphone 110*b* to generate a second electrical signal having a second phase opposite the first phase. For example, a second directional microphone 110*b* arranged reversed in space (i.e., turned around) with a rear microphone inlet port 114*b* closest to the acoustic input (i.e., sound received from a front of amplified listening device 100) and a front microphone inlet port 112*b* approximately 4 mm behind the rear microphone inlet port 114*b* may receive the acoustic input. The front microphone inlet port 112*b* comprises an acoustic time-delay resistor 116*b* that provides an internal time delay (e.g., approximately 12 microseconds). The acoustic time-delay resistor 116*b* may be a mesh screen made of metal, plastic, fabric, and/or any suitable material. The rear microphone inlet port 114*b* and front microphone inlet port 112*b* of the second directional microphone 110*b* are linearly aligned in a same plane as the front microphone inlet port 112*a* and rear microphone inlet port 114*a* of the first directional microphone 110*a*. The acoustic input is converted to a second electrical signal having a second (i.e., reversed) phase by the second directional microphone 110*b*. The second phase is shifted 180 degrees from the first phase due to the reversed arrangement of the second directional microphone 110*b*. The second electrical signal may be provided to a resistive summing circuit 122 or low pass equalization circuitry 130*b*.

At step 206, the first and second electrical signals are combined with a resistive summing circuit 122 to generate a second order directional response. For example, the resistive summing circuit 122 comprises resistors configured to add the first and second electrical signals output from the first and second directional microphones 110*a*, 110*b* to generate a second order directional response that may be output to low pass equalization circuitry 130, as shown in FIG. 2, for example. Alternatively, the resistive summing circuit 122 may receive the first and second electrical signals from first and second low pass equalization circuitry 130*a*, 130*b*, respectively, to generate the second order directional response that may be output to the amplifier 140. Accordingly, the low pass equalization may be performed before or after the first and second electrical signals output from the first and second directional microphones 110*a*, 110*b* are combined by the resistive summing circuitry 122 to generate the second order directional response. The resistive summing circuit 122 of the present technology does not include phase inverting circuitry. The two out-of-phase electrical signals output from the first and second directional microphones 110*a*, 110*b* as arranged according to embodiments of the present technology eliminates a need for the additional, expensive circuitry for performing electronic subtraction of two in-phase electrical signals.

At step 208, the second order directional response is amplified to generate an output electrical signal. For example, an amplifier 140 may be configured to process the equalized second order directional response signal received from low pass equalization circuitry 130 (if the low pass equalization circuitry 130 is provided after the resistive summing circuit 122) or from the resistive summing circuit 122 (if the low pass equalization circuitry 130*a*, 130*b* is provided before the resistive summing circuit 122) to amplify the equalized second order directional response signal. The low pass equalization circuitry 130, 130*a*, 130*b* may comprise suitable logic, circuits, interface, and/or code configured to at least partially equalize the amplitude of the low frequency electrical signal components of the electrical signal received from the directional microphone 110*a*, 110*b* or resistive summing circuit 122 with the amplitude of the mid and high frequency electrical signal components of the electrical signal. The equalized second order directional response is provided to the amplifier 140, which processes the equalized second order directional response signal to amplify the signal. In various embodiments, an amount of amplification provided by the amplifier 140 may be based on a volume control. The amplifier 140 outputs the amplified second order directional response electrical signal to the receiver 150.

At step 210, the output electrical signal is transduced to an acoustic output. For example, a receiver 150 of the amplified listening device 100 may be configured to convert the amplified second order directional response electrical signals to sound. The sound may be communicated from the receiver 150 to a user's ear canal through an acoustic channel 174 in a sound tube 172.

Figure 5:
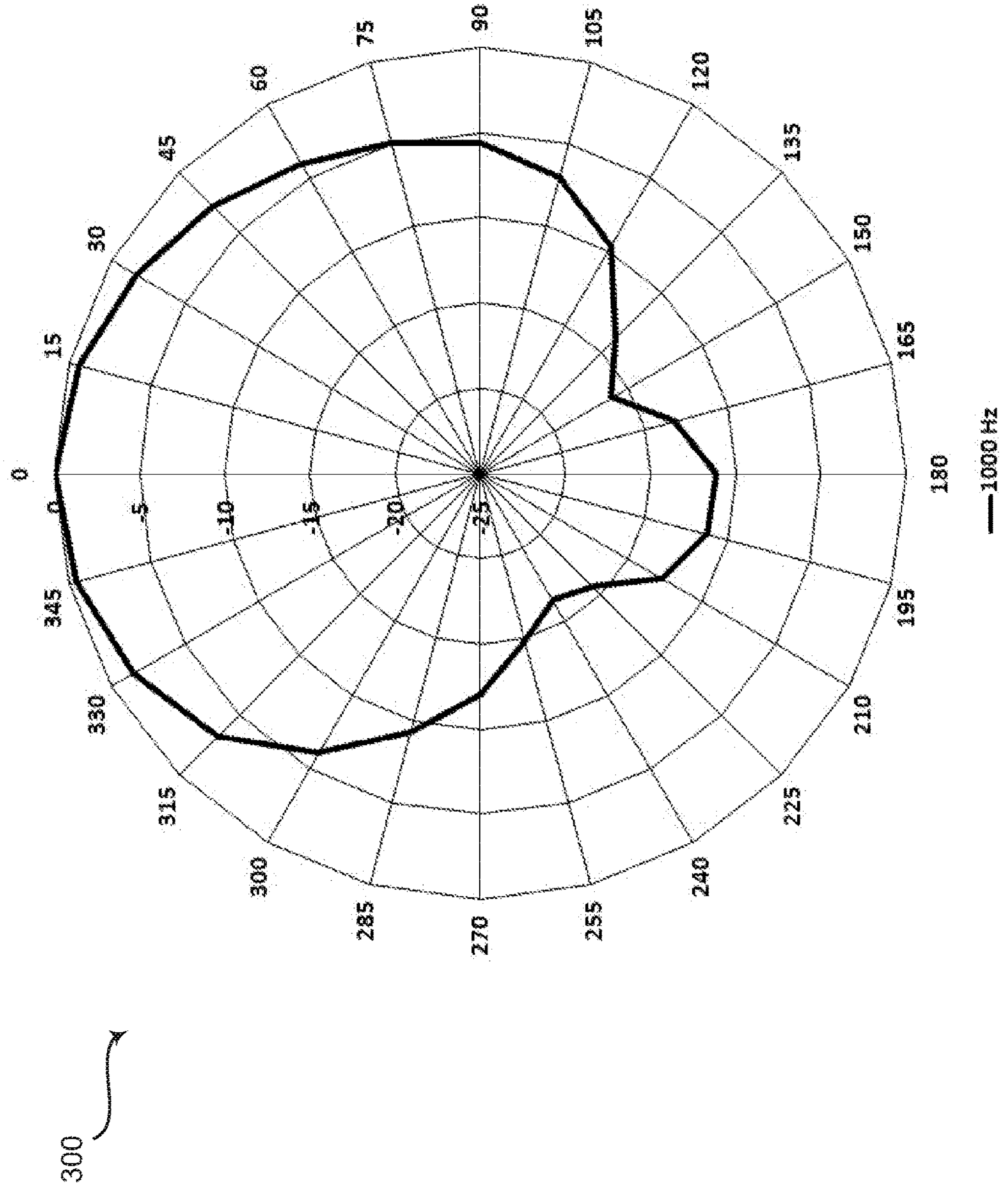
FIG. 5 is a free field polar plot on a stand at 1 kHz of an exemplary amplified listening device provided with two first-order directional microphones arranged in tandem to form a second-order directional microphone system, in accordance with embodiments of the present technology.

FIG. 5 is a free field polar plot 300 on a stand at 1 kHz of an exemplary amplified listening device 100 provided with two first-order directional microphones 110*a*, 110*b* arranged in tandem to form a second-order directional microphone system, in accordance with embodiments of the present technology. Referring to FIG. 5, the polar plot 300 at 1 kHz is shown for two first-order directional microphones 110*a*, 110*b* spaced apart by 18 mm and arranged in tandem to form the second-order directional microphone system. As shown in FIG. 5, noise arriving mostly from the sides or back may be attenuated 20 dB or more. Accordingly, an improvement of over 7 dB may be achieved in a low-reverberation environment.

Figure 6:
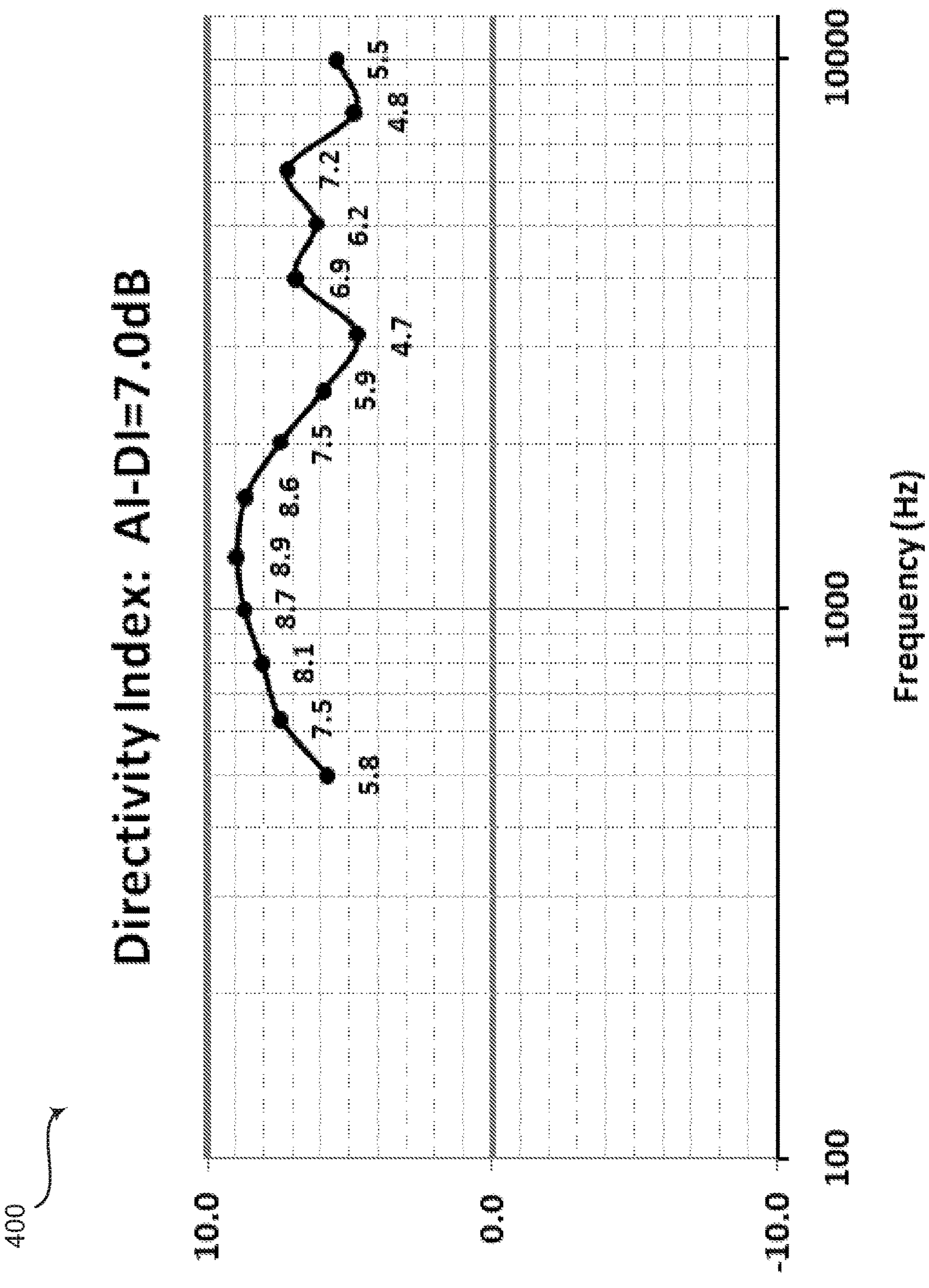
FIG. 6 is a graph of the Articulation Index-Directivity Index (AI-DI) of an exemplary amplified listening device provided with two first-order directional microphones arranged in tandem to form a second-order directional microphone system, in accordance with embodiments of the present technology.

FIG. 6 is a graph 400 of the Articulation Index-Directivity Index (AI-DI) of an exemplary amplified listening device 100 provided with two first-order directional microphones 110*a*, 110*b* arranged in tandem to form a second-order directional microphone system, in accordance with embodiments of the present technology. Referring to FIG. 6, the graph 400 of the AI-DI is shown between 500 Hz and 10 kHz for two first-order directional microphones 110*a*, 110*b* spaced apart by 18 mm and arranged in tandem to form the second-order directional microphone system. The average AI-DI from 500 Hz to 10 kHz is approximately 7 dB and is approximately 8.7 dB at 1 kHz.

Aspects of the present disclosure provide an amplified listening device 100 comprising two first-order directional microphones 110*a*, 110*b* arranged in tandem to form a second-order directional microphone system. The amplified listening device 100 may comprise a housing 170, 180 comprising a sound tube 172 having an acoustic channel 174. The amplified listening device 100 may comprise a first directional microphone 110*a* configured to provide a first electrical signal having a first phase. The first directional microphone 110*a* may comprise a first front microphone inlet port 112*a* closest a front of the amplified listening device 100. The first directional microphone 110*a* may comprise a first rear microphone inlet port 114*a* behind the first front microphone inlet port 112*a*. The amplified listening device 100 may comprise a second directional microphone 110*b* configured to provide a second electrical signal having a second phase opposite the first phase. The second directional microphone 110*b* may comprise a second rear microphone inlet port 114*b* adjacent the first rear microphone inlet port 114*a* of the first directional microphone 110*a*. The second directional microphone 110*b* may comprise a second front microphone inlet port 112*b* behind the second rear microphone inlet port 114*b*. The first front microphone inlet port 112*a*, the first rear microphone inlet port 114*a*, the second rear microphone inlet port 114*b*, and the second front microphone inlet port 112*b* are linearly aligned in a same plane. The amplified listening device 100 may comprise a resistive summing circuit 122 without phase inverting circuitry. The resistive summing circuit 122 may be configured to combine the first electrical signal and the second electrical signal to generate a second order directional response. The amplified listening device 100 may comprise a receiver 150 configured to convert the second order directional response to sound. The receiver 150 may be configured to output the sound through the acoustic channel 174 of the sound tube 172.

In an exemplary embodiment, the amplified listening device 100 may comprise a first acoustic time-delay resistor 116*a* in the first rear microphone inlet port 114*a* of the first directional microphone 110*a*. The amplified listening device 100 may comprise a second acoustic time-delay resistor 116*b* in the second front microphone inlet port 112*b* of the second directional microphone 110*b*. Each of the first acoustic time-delay resistor 116*a* and the second acoustic time-delay resistor 116*b* is configured to provide an internal time delay. In a representative embodiment, one or both of the first acoustic time-delay resistor 116*a* and the second acoustic time-delay resistor 116*b* is a mesh screen. In certain embodiments, the mesh screen comprises metal, plastic, or fabric. In various embodiments, the amplified listening device 100 comprises low pass equalization circuitry 130 configured to perform low pass amplification by at least partially equalizing a first amplitude of low frequency electrical signal components of the second order directional response with a second amplitude of mid and high frequency electrical signal components of the second order directional response. In an exemplary embodiment, the low pass equalization circuitry 130 receives the second order directional response from the resistive summing circuit 122. The low pass amplification is performed prior to the receiver 150 converting the second order directional response to sound.

In a representative embodiment, the amplified listening device 100 comprises first low pass equalization circuitry 130*a* configured to perform low pass amplification by at least partially equalizing a first amplitude of low frequency electrical signal components of the first electrical signal with a second amplitude of mid and high frequency electrical signal components of the first electrical signal. The amplified listening device 100 comprises second low pass equalization circuitry 130*b* configured to perform low pass amplification by at least partially equalizing a first amplitude of low frequency electrical signal components of the second electrical signal with a second amplitude of mid and high frequency electrical signal components of the second electrical signal. In certain embodiments, the first low pass equalization circuitry 130*a* receives the first electrical signal from the first directional microphone 110*a*. The second low pass equalization circuitry 130*b* receives the second electrical signal from the second directional microphone 110*b*. The low pass amplification of the first electrical signal and the second electrical signal is performed prior to the resistive summing circuit 122 combining the first electrical signal and the second electrical signal to generate the second order directional response. In various embodiments, the amplified listening device 100 comprises an amplifier 140 configured to amplify the second order directional response signal prior to the receiver 150 converting the second order directional response to sound. In an exemplary embodiment, one or both of the first directional microphone 110*a* and the second directional microphone 110*b* is a cardioid electret microphone (ccMIC).

Various embodiments provide a method 200 for providing a second order acoustic output via two first-order directional microphones 110*a*, 110*b* arranged in tandem to form a second-order directional microphone system of an amplified listening device 100. In accordance with various embodiments, the method 200 may comprise receiving 202 an acoustic input at a first directional microphone 110*a* of an amplified listening device 100. The first directional microphone 110*a* comprises a first front microphone inlet port 112*a* closest a front of the amplified listening device 100. The first directional microphone 110*a* comprises a first rear microphone inlet port 114*a* behind the first front microphone inlet port 112*a*. The method 200 may comprise generating 202, by the first directional microphone 110*a*, a first electrical signal having a first phase. The method 200 may comprise receiving 204 the acoustic input at a second directional microphone 110*b* of the amplified listening device 100. The second directional microphone 110*b* comprises a second rear microphone inlet port 114_b_ adjacent the first rear microphone inlet port 114_a_ of the first directional microphone 110_a_. The second directional microphone 110_b_ comprises a second front microphone inlet port 112_b_ behind the second rear microphone inlet port 114_b_. The first front microphone inlet port 112_a_, the first rear microphone inlet port 114_a_, the second rear microphone inlet port 114_b_, and the second front microphone inlet port 112_b_ are linearly aligned in a same plane. The method 200 may comprise generating 204, by the second directional microphone 110_b_, a second electrical signal having a second phase opposite the first phase. The method 200 may comprise combining 206, by a resistive summing circuit 122 of the amplified listening device 100, the first electrical signal and the second electrical signal to generate a second order directional response. The resistive summing circuit 122 does not include phase inverting circuitry. The method 200 may comprise converting 210, by a receiver 150 of the amplified listening device 100, the second order directional response to sound. The method 200 may comprise outputting 210, by the receiver 150, the sound through an acoustic channel 174 of a sound tube 172 of the amplified listening device 100.

In certain embodiments, a first acoustic time-delay resistor 116_a_ is positioned in the first rear microphone inlet port 114_a_ of the first directional microphone 110_a_. A second acoustic time-delay resistor 116_b_ is positioned in the second front microphone inlet port 112_b_ of the second directional microphone 110_b_. Each of the first acoustic time-delay resistor 116_a_ and the second acoustic time-delay resistor 116_b_ provides an internal time delay. In various embodiments, one or both of the first acoustic time-delay resistor 116_a_ and the second acoustic time-delay resistor 116_b_ is a mesh screen. In an exemplary embodiment, the mesh screen comprises metal, plastic, or fabric. In a representative embodiment, the method 200 comprises performing 208, by low pass equalization circuitry 130 of the amplified listening device 100, low pass amplification by at least partially equalizing a first amplitude of low frequency electrical signal components of the second order directional response with a second amplitude of mid and high frequency electrical signal components of the second order directional response. In certain embodiments, the method 200 comprises receiving 206, 208, by the low pass equalization circuitry 130, the second order directional response from the resistive summing circuit 122. The low pass amplification 208 is performed prior to the converting 210 the second order directional response to sound.

In various embodiments, the method 200 comprises performing 202, 206, 208, by first low pass equalization circuitry 130_a_, low pass amplification by at least partially equalizing a first amplitude of low frequency electrical signal components of the first electrical signal with a second amplitude of mid and high frequency electrical signal components of the first electrical signal. The method 200 may comprise performing 204, 206, 208, by second low pass equalization circuitry 130_b_, low pass amplification by at least partially equalizing a first amplitude of low frequency electrical signal components of the second electrical signal with a second amplitude of mid and high frequency electrical signal components of the second electrical signal. In an exemplary embodiment, the method 200 comprises receiving 202, 206, 208, by the first low pass equalization circuitry 130_a_, the first electrical signal from the first directional microphone 110_a_. The method 200 may comprise receiving 204, 206, 208, by the second low pass equalization circuitry 130_b_, the second electrical signal from the second directional microphone 110_b_. The low pass amplification 202-208 of the first electrical signal and the second electrical signal is performed prior to the combining 206 the first electrical signal and the second electrical signal to generate the second order directional response. In a representative embodiment, the method 200 comprises amplifying 208, by an amplifier 140 of the amplified listening device 100, the second order directional response signal prior to the converting 210 the second order directional response to sound. In certain embodiments, one or both of the first directional microphone 110_a_ and the second directional microphone 110_b_ is a cardioid electret microphone (ccMIC).

As utilized herein the term "circuitry" refers to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or". As an example, "x and/or y" means any element of the three-element set {(x), (y), (x, y)}. As another example, "x, y, and/or z" means any element of the seven-element set {(x), (y), (z), (x, y), (x, z), (y, z), (x, y, z)}. As utilized herein, the term "exemplary" means serving as a non-limiting example, instance, or illustration. As utilized herein, the terms "e.g.," and "for example" set off lists of one or more non-limiting examples, instances, or illustrations. As utilized herein, circuitry is "operable" and/or "configured" to perform a function whenever the circuitry comprises the necessary hardware and code (if any is necessary) to perform the function, regardless of whether performance of the function is disabled, or not enabled, by some user-configurable setting.

The present disclosure may be realized in hardware, software, or a combination of hardware and software.

While the present disclosure has been described with reference to certain embodiments, it will be understood by those skilled in the art that various changes may be made and equivalents may be substituted without departing from the scope of the present disclosure. In addition, many modifications may be made to adapt a particular situation or material to the teachings of the present disclosure without departing from its scope. Therefore, it is intended that the present disclosure not be limited to the particular embodiment disclosed, but that the present disclosure will include all embodiments falling within the scope of the appended claims.

What is claimed is:

1. An amplified listening device comprising:

a housing comprising a sound tube having an acoustic channel;

a first directional microphone configured to provide a first electrical signal having a first phase, the first directional microphone comprising:

a first front microphone inlet port closest a front of the amplified listening device; and a first rear microphone inlet port behind the first front microphone inlet port;

a second directional microphone configured to provide a second electrical signal having a second phase opposite the first phase, the second directional microphone comprising:

a second rear microphone inlet port adjacent the first rear microphone inlet port of the first directional microphone; and a second front microphone inlet port behind the second rear microphone inlet port, wherein the first front microphone inlet port, the first rear microphone inlet port, the second rear microphone inlet port, and the second front microphone inlet port are linearly aligned in a same plane;

a resistive summing circuit without phase inverting circuitry, the resistive summing circuit configured to combine the first electrical signal and the second electrical signal to generate a second order directional response; and a receiver configured to:

convert the second order directional response to sound; and output the sound through the acoustic channel of the sound tube.

2. The amplified listening device of claim 1, comprising:

a first acoustic time-delay resistor in the first rear microphone inlet port of the first directional microphone; and a second acoustic time-delay resistor in the second front microphone inlet port of the second directional microphone, wherein each of the first acoustic time-delay resistor and the second acoustic time-delay resistor is configured to provide an internal time delay.

3. The amplified listening device of claim 2, wherein one or both of the first acoustic time-delay resistor and the second acoustic time-delay resistor is a mesh screen.

4. The amplified listening device of claim 3, wherein the mesh screen comprises metal, plastic, or fabric.

5. The amplified listening device of claim 1, comprising low pass equalization circuitry configured to perform low pass amplification by at least partially equalizing a first amplitude of low frequency electrical signal components of the second order directional response with a second amplitude of mid and high frequency electrical signal components of the second order directional response.

6. The amplified listening device of claim 5, wherein:

the low pass equalization circuitry receives the second order directional response from the resistive summing circuit, and the low pass amplification is performed prior to the receiver converting the second order directional response to sound.

7. The amplified listening device of claim 1, comprising;

first low pass equalization circuitry configured to perform low pass amplification by at least partially equalizing a first amplitude of low frequency electrical signal components of the first electrical signal with a second amplitude of mid and high frequency electrical signal components of the first electrical signal; and second low pass equalization circuitry configured to perform low pass amplification by at least partially equalizing a first amplitude of low frequency electrical signal components of the second electrical signal with a second amplitude of mid and high frequency electrical signal components of the second electrical signal.

8. The amplified listening device of claim 7, wherein:

the first low pass equalization circuitry receives the first electrical signal from the first directional microphone, the second low pass equalization circuitry receives the second electrical signal from the second directional microphone, and the low pass amplification of the first electrical signal and the second electrical signal is performed prior to the resistive summing circuit combining the first electrical signal and the second electrical signal to generate the second order directional response.

9. The amplified listening device of claim 1, comprising an amplifier configured to amplify the second order directional response signal prior to the receiver converting the second order directional response to sound.

10. The amplified listening device of claim 1, wherein one or both of the first directional microphone and the second directional microphone is a cardioid electret microphone (ccMIC).

11. A method comprising:

receiving an acoustic input at a first directional microphone of an amplified listening device, the first directional microphone comprising:

a first front microphone inlet port closest a front of the amplified listening device; and a first rear microphone inlet port behind the first front microphone inlet port;

generating, by the first directional microphone, a first electrical signal having a first phase;

receiving the acoustic input at a second directional microphone of the amplified listening device, the second directional microphone comprising:

a second rear microphone inlet port adjacent the first rear microphone inlet port of the first directional microphone; and a second front microphone inlet port behind the second rear microphone inlet port, wherein the first front microphone inlet port, the first rear microphone inlet port, the second rear microphone inlet port, and the second front microphone inlet port are linearly aligned in a same plane;

generating, by the second directional microphone, a second electrical signal having a second phase opposite the first phase;

combining, by a resistive summing circuit of the amplified listening device, the first electrical signal and the second electrical signal to generate a second order directional response, wherein the resistive summing circuit does not include phase inverting circuitry;

converting, by a receiver of the amplified listening device, the second order directional response to sound; and outputting, by the receiver, the sound through an acoustic channel of a sound tube of the amplified listening device.

12. The method of claim 11, wherein:

a first acoustic time-delay resistor is positioned in the first rear microphone inlet port of the first directional microphone, a second acoustic time-delay resistor is positioned in the second front microphone inlet port of the second directional microphone, and each of the first acoustic time-delay resistor and the second acoustic time-delay resistor provides an internal time delay.

13. The method of claim 12, wherein one or both of the first acoustic time-delay resistor and the second acoustic time-delay resistor is a mesh screen.

14. The method of claim 13, wherein the mesh screen comprises metal, plastic, or fabric.

15. The method of claim 11, comprising performing, by low pass equalization circuitry of the amplified listening device, low pass amplification by at least partially equalizing a first amplitude of low frequency electrical signal components of the second order directional response with a second amplitude of mid and high frequency electrical signal components of the second order directional response.

16. The method of claim 15, comprising receiving, by the low pass equalization circuitry, the second order directional response from the resistive summing circuit, wherein the low pass amplification is performed prior to the converting the second order directional response to sound.

17. The method of claim 11, comprising;

performing, by first low pass equalization circuitry, low pass amplification by at least partially equalizing a first amplitude of low frequency electrical signal components of the first electrical signal with a second amplitude of mid and high frequency electrical signal components of the first electrical signal; and performing, by second low pass equalization circuitry, low pass amplification by at least partially equalizing a first amplitude of low frequency electrical signal components of the second electrical signal with a second amplitude of mid and high frequency electrical signal components of the second electrical signal.

18. The method of claim 17, comprising:

receiving, by the first low pass equalization circuitry, the first electrical signal from the first directional microphone; and receiving, by the second low pass equalization circuitry, the second electrical signal from the second directional microphone, wherein the low pass amplification of the first electrical signal and the second electrical signal is performed prior to the combining the first electrical signal and the second electrical signal to generate the second order directional response.

19. The method of claim 11, comprising amplifying, by an amplifier of the amplified listening device, the second order directional response signal prior to the converting the second order directional response to sound.

20. The method of claim 11, wherein one or both of the first directional microphone and the second directional microphone is a cardioid electret microphone (ccMIC).

* * * * *